(12) United States Patent
Owen

(10) Patent No.: US 12,431,821 B2
(45) Date of Patent: Sep. 30, 2025

(54) ENERGY STORAGE AND CONVERSION USING FLUID ENERGY AND ELECTRIC FIELD TO CREATE ELECTRIC CHARGE

(71) Applicant: IONECH LIMITED, London (GB)

(72) Inventor: Nathan Owen, Dorset (GB)

(73) Assignee: IONECH LIMITED, London (GB)

( * ) Notice: Subject to any disclaimer, the term of this patent is extended or adjusted under 35 U.S.C. 154(b) by 539 days.

(21) Appl. No.: 17/275,516

(22) PCT Filed: Sep. 11, 2019

(86) PCT No.: PCT/EP2019/074212
§ 371 (c)(1),
(2) Date: Mar. 11, 2021

(87) PCT Pub. No.: WO2020/053266
PCT Pub. Date: Mar. 19, 2020

(65) Prior Publication Data
US 2022/0045631 A1    Feb. 10, 2022

(30) Foreign Application Priority Data
Sep. 11, 2018    (GB) ..................................... 1814767

(51) Int. Cl.
    H02N 3/00    (2006.01)
(52) U.S. Cl.
    CPC ..................................... H02N 3/00 (2013.01)
(58) Field of Classification Search
    CPC .................................. H02N 3/00; Y02E 60/50
    See application file for complete search history.

(56) References Cited

U.S. PATENT DOCUMENTS 3,355,605 A    11/1967    Okress
3,582,694 A *   6/1971    Gourdine ................. H02N 3/00
                                                          310/10

(Continued)

FOREIGN PATENT DOCUMENTS

JP    S5987042 A  * 12/1982
KR    101191769 B1 * 10/2012

(Continued)

OTHER PUBLICATIONS

KR101191769B1 English translation (Year: 2023).*

(Continued)

*Primary Examiner* — Christopher M Koehler
*Assistant Examiner* — Viswanathan Subramanian
(74) *Attorney, Agent, or Firm* — Lee & Hayes, P.C.

(57) ABSTRACT

A device for converting energy of a fluid to electrical energy is disclosed. The device comprises a pressure vessel having an inlet port for a fluid. A pair of charge collecting electrodes is spaced apart from each other along a collection direction and disposed within the pressure vessel. An electric field generator is configured to generate an electric field in the pressure vessel along a field direction to separate charged species in the fluid. Other disclosed devices provide a current flow delay to encourage charge build up or illumination with electromagnetic radiation. Yet other devices are arranged for fluid flow rather than pressure. Also disclosed is a system comprising any one of the disclosed devices and related methods. The disclosure may find application, for example, in providing a source of energy for an electric vehicle.

20 Claims, 6 Drawing Sheets

(56) References Cited

U.S. PATENT DOCUMENTS

| | | | |
|---|---|---|---|
| 4,339,678 A * | 7/1982 | Gawain | H02N 3/00 310/10 |
| 2004/0231315 A1 | 11/2004 | Gonzalez | |
| 2006/0150611 A1 * | 7/2006 | Allen | H02K 44/00 60/203.1 |
| 2007/0195481 A1 | 8/2007 | McCowen | |
| 2009/0301796 A1 | 12/2009 | Wedderburn, Jr. et al. | |
| 2011/0148248 A1 * | 6/2011 | Landa | H02N 11/002 310/306 |
| 2012/0153772 A1 * | 6/2012 | Landa | B28B 11/24 428/221 |
| 2012/0211989 A1 | 8/2012 | Carmein et al. | |
| 2013/0015257 A1 | 1/2013 | Kalra et al. | |
| 2013/0313942 A1 * | 11/2013 | White | H02N 3/00 310/308 |
| 2016/0149519 A1 * | 5/2016 | Stevenson | H02N 3/00 310/309 |

FOREIGN PATENT DOCUMENTS

| | | | | |
|---|---|---|---|---|
| RU | 2061297 C1 | 5/1996 | | |
| RU | 2538758 | 10/2013 | | |
| WO | WO2012054503 | 4/2012 | | |
| WO | WO-2014003625 A1 * | 1/2014 | | H02N 3/00 |
| WO | WO-2015110838 A1 * | 7/2015 | | H02N 3/00 |

OTHER PUBLICATIONS

JPS5987042A English translation (Year: 2024).*

RU Office Action from corresponding Russian Patent Application No. 2021109871/07 dated Apr. 22, 2022, 7 pages.

PCT Search Report for corresponding PCT Application No. PCT/EP2019/074212 dated May 12, 2019, 18 pages.

Translated an Office Action from the Japan Patent Office for Application No. 2021-513812, mailed on Jun. 6, 2023, a counterpart foreign application of U.S. Appl. No. 17/275,516, 5 pgs.

A Substantive Examination Report from the Saudi Authority for Intellectual Property office for Application No. 521421436, a counterpart foreign application of U.S. Appl. No. 17/275,516, 12 pages (translated via Google Translate).

A Substantive Examination Report from the Saudi Authority for Intellectual Property office for Application No. 521421436, a counterpart foreign application of U.S. Appl. No. 17/275,516, 12 pages (translated via www.onlinedoctranslator.com).

Translated the Notice of Opinion from the South Korean Patent Office for Application No. 10-2021-7010565, mailed on Jan. 19, 2024, a counterpart foreign application of U.S. Appl. No. 17/275,516, 22 pages.

Translated the Search Report from the Brazilian Patent Office for Application No. BR112021004627-5, mailed on Aug. 22, 2023, a counterpart foreign application of U.S. Appl. No. 17/275,516, 8 pages.

The Chinese Office Action mailed Dec. 29, 2023, for Chinese Patent Application 2023122903121460, a foreign counterpart to U.S. Appl. No. 17/275,516, 25 pages.

European Office Action mailed Feb. 2, 2024, for EP Patent Application 19773363.7, a foreign counterpart to U.S. Appl. No. 17/275,516, 4 pages.

Japanese Office Action dated Dec. 5, 2023 for Japanese Patent Application No. 2021-213812, a foreign counterpart to U.S. Appl. No. 17/275,516.

Australian Office Action mailed on May 15, 2024 for Australian Patent Application No. 2019338223, a foreign counter part of U.S. Appl. No. 17/275,516, 4 pages.

Chinese Office Action mailed on Aug. 29, 2024, for Chinese Patent Application No. 201980073448.7, a foreign counterpart of U.S. Appl. No. 17/275,516, 29 pages.

Mexican Office Action mailed on Jul. 1, 2024, for Mexican Patent Application No. MX/a/2021/002946, a foreign counterpart of U.S. Appl. No. 17/275,516, 18 pages.

Thai Office Action mailed on Jul. 30, 2024, for Thai Patent Application No. 2101001375, a foreign counter part of U.S. Appl. No. 17/275,516, 8 pages.

* cited by examiner

ENERGY STORAGE AND CONVERSION USING FLUID ENERGY AND ELECTRIC FIELD TO CREATE ELECTRIC CHARGE

This Application is a US national stage application under 35 USC § 371 of PCT application PCTEP2019/074212 filed on Sep. 11, 2019, which claims priority to GB Patent Application No. 1814767.8 filed on Sep. 11, 2018, which is incorporated herein by reference.

This disclosure relates to the storage and conversion of energy, specifically converting energy in the form of kinetic or potential energy in a fluid, for example a gas, into electric energy.

BACKGROUND

Most energy storage solutions at a portable scale involve storage of energy in chemical form in a battery or fuel cell to convert the stored energy to electrical energy at a time when it is needed. Much active research is undertaken to develop and improve batteries and fuel cells to address such issues as limited cycle life of batteries and safety of use of fuel cells.

Storage of energy in the form of potential (pressure) energy in a gas or liquid is also known. For example, it is known to use electricity during times of low demand to pump water to a higher potential and to allow the pumped water to fall through an electricity generating turbine during times of high demand. Similarly, storage of energy in a gas at constant pressure (e.g. undersea storage) or constant volume (e.g. underground storage) is also known. However, those forms of energy storage require large-scale installations and complex arrangements including turbines and electric machines to convert the stored energy to electrical energy.

There is a continuous need for improved or alternative forms of energy storage, in particular although not exclusively at a scale that is portable, for example so that they can be installed in an electric vehicle.

SUMMARY

In a first aspect, a device for converting energy of a fluid to electrical energy comprises a flow chamber having an inlet port for a fluid and an exhaust port for the fluid. A pair of charge collecting electrodes is spaced apart from each other along a collection direction and disposed within the flow chamber. An electric field generator is configured to generate an electric field in the flow chamber along a field direction to separate charged species in the fluid. A flow path of the fluid between the inlet port and the exhaust port has a flow direction with a component along the collection direction and a component along the field direction.

A first one of positive and negative charged species separated by the electric field is biased by the electric field to move generally in the same direction as the fluid flow as a result of the charge separation and a second one of the positive and negative charged species is biased by the electric field to move generally in a direction opposed to the direction of fluid flow (i.e. resulting in a, respectively, positive and negative scalar product between the directions of field induced movement and the direction of flow). Since the flow may affect the charged species differentially, an additional charge separation in addition to that caused by the electric field results between the collection electrodes, hence converting the kinetic energy of fluid flow (resulting, for example from the potential energy of a pressure in a pressurised fluid vessel) to electrical energy that can be dissipated in a load. In the case of a ionised gas or other fluids that have different mobilities of charged species, one of the charged species may be influenced more by the fluid flow (e.g. gas ions) than the other (e.g. electrons). As a result, the species more susceptible to the flow may be preferentially leaving the flow chamber through the exhaust, while the other species may preferentially be captured by its corresponding capture electrode, therefore increasing the potential difference between the capture electrodes and providing electrical energy associated with the excess charge.

It will be appreciated that where theories of operation are described in this disclosure, these are presented for the purpose of illustration and not to limit the scope of the disclosure.

In some embodiments, the field and flow directions may be substantially parallel, as may be the collection and flow directions. Advantageously, this may maximise the effect of the fluid flow, although an effect will be present as long as there is a non-zero scalar product between the flow direction and the field and/or collection direction. In some embodiments, an angle between the field and flow directions and/or an angle between the collection and flow direction may be between-n and n degrees or between 180-n and 180+n degrees, wherein n is less than 45 degrees, for example less than 30, 20 or 10 degrees. In some embodiments, n may be less than 5 degrees. In some embodiments, the field and collection directions may be substantially parallel. In some embodiments, the flow path passes through one or both of the charge collecting electrodes. For example, the charge collecting electrodes may be mesh electrodes. The charge collection electrodes may be centred on an axis coinciding with at least a portion of the flow path.

In a second aspect, a device for converting energy of a fluid to electrical energy comprises a pressure vessel having an inlet port for a fluid. A pair of charge collecting electrodes is spaced apart from each other along a collection direction and disposed within the flow chamber. An electric field generator is configured to generate an electric field in the flow chamber along a field direction to separate charged species in the fluid. Similarly to the first aspect this aspects converts kinetic energy (in the form of random particle movement in the pressurised fluid) to electric energy.

In some embodiments, the pressure vessel may have an exhaust port configured to restrict flow through the exhaust port to less than 0.1 ml/minute for 10 bar of pressure applied to the inlet port, for example of an inert gas such as Neon.

In some embodiments of any of the above aspects, the device may comprise a source of electromagnetic radiation, for example a UV light source, for irradiating a pressurised fluid and/or the collector electrodes inside the pressure vessel. The source of electromagnetic radiation may be configured to generate electromagnetic radiation in a wavelength range of 120 NM to 820 NM. In practice, the wavelength(s) used may depend on the material of the collector electrodes, for example about 275 nm, or in a range of 120 nm to 275 nm inclusive, for Tungsten electrodes.

In some embodiments of any of the above aspects, the device may comprise a current delay arrangement for delaying current flow from the collection electrode until an amount of charge has built up on the collection electrode. The current delay arrangement may comprise a further pressure vessel sealed around a portion of the collection electrode protruding out of the pressure vessel and a further electrode disposed in the further pressure vessel wherein respective free ends of the collection electrode and further electrode define a spark gap therebetween. Current delay arrangements may further comprise a timed switch, a voltage or current triggered relay, a diode and the like.

In a third aspect the flow path may be any suitable flow path instead of the one described above and the device comprises
- a source of electromagnetic radiation for irradiating a pressurised fluid and/or the collector electrodes inside the pressure vessel, preferably wherein the source of electromagnetic radiation is configured to generate electromagnetic radiation in a wavelength range of 120 NM to 820 NM; and/or
- a current delay arrangement for delaying current flow from the collection electrode until an amount of charge has built up on the collection electrode, preferably wherein the current delay arrangement comprises a further pressure vessel sealed around a portion of the collection electrode protruding out of the pressure vessel and a further electrode disposed in the further pressure vessel wherein respective free ends of the collection electrode and further electrode define a spark gap therebetween.

In some embodiments of any of the above aspects, the electric field is an ionising electric field to ionise the fluid. The fluid may be a gas, such as air, Argon or Neon, and ionising the fluid may comprise generating a plasma and/or electrical discharge, for example a dark discharge or corona discharge in the flow chamber. In such embodiments, one of the charged species are electrons stripped of the gas molecules and the other charged species are the resulting positively charged gas ions. In particular, the fluid flow may affect the charged ions more than the free electrons, so that differentially more charged ions than electrons leave the flow chamber by means of the fluid flow, thereby increasing the charge separation and hence electric potential between the collector electrodes. In other embodiments, the fluid may be a liquid, for example with positively and negatively charged ions in solution.

The electric field generator may be configured to generate a continuous electric field or a time-varying electric field, for example generating a pulsed electric field with a field strength that varies in time as a sequence of pulses. In some embodiments, the electric field generator comprises a pair of field generating electrodes spaced apart along the field direction and disposed on either side of the flow chamber. The field generating electrodes may in some embodiments be provided by the charge generating electrodes. In other embodiments, the field generating electrodes may be separate from the charge collecting electrodes and may be electrically isolated from the flow chamber.

The field generating electrodes that may be driven by any suitable voltage source, for example any high voltage (HV) supply, for instance comprising a battery as power source. A suitable voltage source may additionally or alternatively comprise a HV capacitor. The voltage source may be a pulsed voltage source to provide a pulsed electric field generator that generates a sequence of pulses of electric field to separate charges.

In some embodiments of any of the above aspects only a single collection electrode, rather than a pair of collection electrodes, is disposed in the flow chamber or pressure vessel, as the case may be.

In a fourth aspect, a method of converting energy of a fluid to electric energy comprises causing the fluid to flow through a flow chamber along a flow direction. The fluid may be pressurised and causing the fluid to flow may cause conversion of the potential energy in the pressurised fluid to kinetic energy of the flowing fluid. An electric field is applied to the fluid flowing in the flow chamber. The electric field may have a field direction with a component along the flow direction. As a result, positive and negative charged species of the fluid are separated along the field direction with one of the positive and negative charged species being biased to move in a direction having a component in the flow direction and the other one of the positive and negative charged species being biased to move in a direction having a component in a direction opposite the flow direction. Each of the positive and negative charged species are collected at a respective current collector and a current is drawn from one of the current collectors to provide electrical energy to a load.

In some embodiments, the method comprises sensing a quantity indicative of energy dissipated by the load and regulating a rate of flow of the fluid as a function of the quantity indicative of energy dissipated by the load. Alternatively or additionally, the method may comprise receiving a quantity indicative of energy demand by the load and regulating a rate of flow of the fluid as a function of the quantity indicative of energy demand by the load.

In a fifth aspect, a method of converting energy of a fluid to electric energy comprises causing the fluid to maintain a pressure in a pressure vessel. An electric field is applied to the fluid in the pressure vessel. As a result, positive and negative charged species of the fluid are separated along the field direction. Each of the positive and negative charged species are collected at a respective current collector and a current is drawn from one of the current collectors to provide electrical energy to a load.

In some embodiments, the pressure is maintained in the presence of a small flow of fluid out of the pressure vessel at a rate of less than 0.1 ml/minute.

In some embodiments of any of the above method aspects, the method may comprise irradiating the pressurised fluid and/or the collector electrodes with electromagnetic radiation while causing the pressurised fluid to flow, preferably irradiating the pressurised fluid with electromagnetic radiation within a wavelength range of 120 NM to 820 NM. In some embodiments of any of the above method aspects, the method may comprise delaying current flow from the current collector or current collectors until an amount of charge has built up on the current collectors, preferably wherein delaying current flow comprises delaying current flow until a spark occurs in a spark gap between a free end of the current collector or collectors protruding outside the pressure vessel and a respective current receiving electrode. In some embodiments of any of the above method aspects, the electric field is applied by pulsing the electric field, for example pulsing an applied voltage to obtain a waveform of pulses for the electric field strength.

In a sixth aspect, any suitable flow path may be used in the above method aspects and the method may comprise one or both of:
- irradiating the pressurised fluid with electromagnetic radiation while causing the pressurised fluid to flow, preferably irradiating the pressurised fluid and/or the collector electrodes with electromagnetic radiation within a wavelength range of 120 NM to 820 NM.
- delaying current flow from the current collector or current collectors until an amount of charge has built up on the current collectors, preferably wherein delaying current flow comprises delaying current flow until a spark occurs in a spark gap between a free end of the current collector or collectors protruding outside the pressure vessel and a respective current receiving electrode.

In some embodiments of any of the above method aspects, the method comprises ionising the fluid, for example a gas, by applying the electric field to the flowing fluid to produce an ionised fluid comprising the negative and positive charged species. Ionising the fluid may comprise one or more of generating a plasma and causing a discharge, for example a dark or corona discharge.

In a seventh aspect, a system for converting energy of a fluid to electric energy comprises any of the devices as described above. The system further comprises a current limited voltage supply to generate the ionising electric field and a load connected to one of the charge collecting electrodes. In some embodiments, the load may be connected to that electrode which is at a lower potential (i.e. the combined field generating and charge collecting electrode collected to the negative terminal of the supply or the charge collecting electrode adjacent the field generating electrode connected to the negative terminal of the supply), which may in some embodiments provide improved efficiency, for example where the fluid is an ionised gas. For example, the load may be connected between one of the charge collecting electrodes and a ground potential. The other one of the charge collecting electrodes may be connected to the ground potential. In some embodiment the load may be connected to a charge collecting electrodes in a floating arrangement. The load may be connected on one side to one charge collecting electrode and on the other side to the other. One side of the load and the corresponding charge collecting electrode may be connected to ground.

In some embodiments, the system comprises a connector for connecting the inlet port to a container containing pressurised fluid. The container may be removably connected to the connector to enable an empty container to be replaced with a fresh container containing pressurised fluid. The container may be installed in the system in a fixed relationship with the device and may be refillable with pressurised fluid, for example via a refill port.

In some embodiments, the system comprises a controller to regulate a rate of flow of the fluid. The controller may be configured to receive a quantity indicative of energy dissipated by the load and to regulate a rate of flow of the fluid as a function of the quantity indicative of energy dissipated by the load. Additionally or alternatively, the controller may be configured to receive a quantity indicative of energy demand by the load and to regulate a rate of flow of the fluid as a function of the quantity indicative of energy demand by the load. The quantity indicative of energy dissipated may be a dissipated power, current drawn by the load, voltage drop across the load or a combination of these. The quantity indicative of energy demand may be a desired power, current to be drawn by the load, voltage to drop across the load or a combination of these, speed or torque demand if the load is a motor, etc. The controller may control a valve to control fluid flow and some or all of the controller may be provided on or in association with the pressurised fluid container and may be removable together with the container.

The load may be an electric motor, for example installed in an electric vehicle, such as an electric or hybrid car, bicycle, tricycle, ship, train or airplane. The load may comprise an electricity supply network, for example a utility substation or an electricity supply network of one or more commercial or residential units, such as one or more houses, apartments or the like.

In some embodiments, the system may allow fluid flow out of the pressure vessel at a rate of less than 0.1 ml/minute, for example the pressure vessel may have an exhaust port configured (due to its dimensions or by way of an adjustable valve) to restrict flow through the exhaust port to less than 0.1 ml/minute for 10 bar of pressure applied to the inlet port, for example of an inert gas such as Neon.

An eighth aspect relates to an electric vehicle comprising a device and/or system as described herein. A ninth aspect relates to an electricity supply network comprising a device and/or system as described herein.

Further aspects and embodiments are disclosed, in which the flow path of the fluid between the inlet port and the exhaust port may have a flow direction with a component in any direction relative to the collection direction and field direction, for example perpendicular to one or both of the first and second directions, rather than being limited to having a flow direction with a component along the collection direction and a component along the field direction.

In any of the relevant described aspects and embodiments, the scalar product of the flow direction and the field direction may be negative, that is the electric field acts to accelerate the negatively charged species, for example electrons, generally in the same direction as the direction of fluid flow, while the fluid flow will counteract the action of the electric field for positive charged species, for example the positive gas ions. This may provide a larger effect due to the larger influence of fluid flow on ion movement than on electron movement and the fluid flow keeping at least a fraction of the positive ions from reaching the negative collection electrode. In other embodiments, the scalar product of the flow direction and the field direction may be positive and the electric field may act to accelerate the positive charged species, for example gas ions, generally in the same direction as the direction of fluid flow.

It will be understood that a first direction being generally along a second direction, or having a component along the second direction is equivalent to there being a non-zero scalar product between respective vectors along the first and second directions (or, by way of short-hand, between the two directions), or that the two directions are not perpendicular and hence have an angle of between zero and less than 90 degrees or between more than 90 degrees and 180 degrees between them (or, depending on the sense in which the angle is measured, between 180 degrees and less than 270 degrees or between more than 270 degrees and 360 degrees).

The fluid may be a gas, for example air, Argon or Neon. Argon or Neon, advantageously, are chemically inert and their charged ions can safely be released to the atmosphere. The same applies to other inert gasses, which may be used in other embodiments. Embodiments that use non-inert gases, such as air containing oxygen and nitrogen, may comprise the use of a capture device capturing and/or decharging ions in the fluid leaving the exhaust port to avoid emitting toxic gasses into the atmosphere. It will of course be appreciated that other embodiments, for example those using inert gases may also comprise the use of such a capture device.

In any of the embodiments described above, the device or system may be configured to limit flow rates in and/or out of the flow chamber or pressure vessel to less than 0.1 ml/minute, for example less than $9 \times 10^{-2}$ ml/minute, less than $8 \times 10^{-2}$ ml/minute or less than $7 \times 10^{-2}$ ml/minute, or may, more generally be configured to cause fluid to flow through the pressure vessel or flow chamber at a flow rate different from 0.1 ml/minute, for example $9 \times 10^{-2}$ ml/minute, $8 \times 10^{-2}$ ml/minute or $7 \times 10^{-2}$ ml/minute, as well as a flow rate higher than 0.1 ml/minute, for example 0.5 ml/minute or higher, 1 ml/minute or higher, 0.05 l/minute or higher, 0.1 ml/minute or higher or 0.2 ml/minute or higher. Equally, the device and/or system may be configured to operate at specific pressure, for example a pressure different from 10 bar, such as more than 10 bar, for example 11 bar or more or 12 bar. The pressure may be less than 10 bar, for example 9 bar or less, 8 bar or less, 7, 6 or 5 bar or less and in any of these cases, the pressure may be more than 1 bar, more than 2 bar, more than 3 bar or more than 4 bar. In some embodiments, the flow rate is substantially zero. For example, in some embodiments, the inlet port is the only fluidic communication path to and from the pressure vessel. It will be appreciated that the corresponding method embodiments may operate accordingly.

BRIEF DESCRIPTION OF THE DRAWINGS

Embodiments are now described by way of example and illustration with reference to the accompanying drawings in which like reference numerals refer to like elements and in which.

DETAILED DESCRIPTION OF EMBODIMENTS

Figure 1:
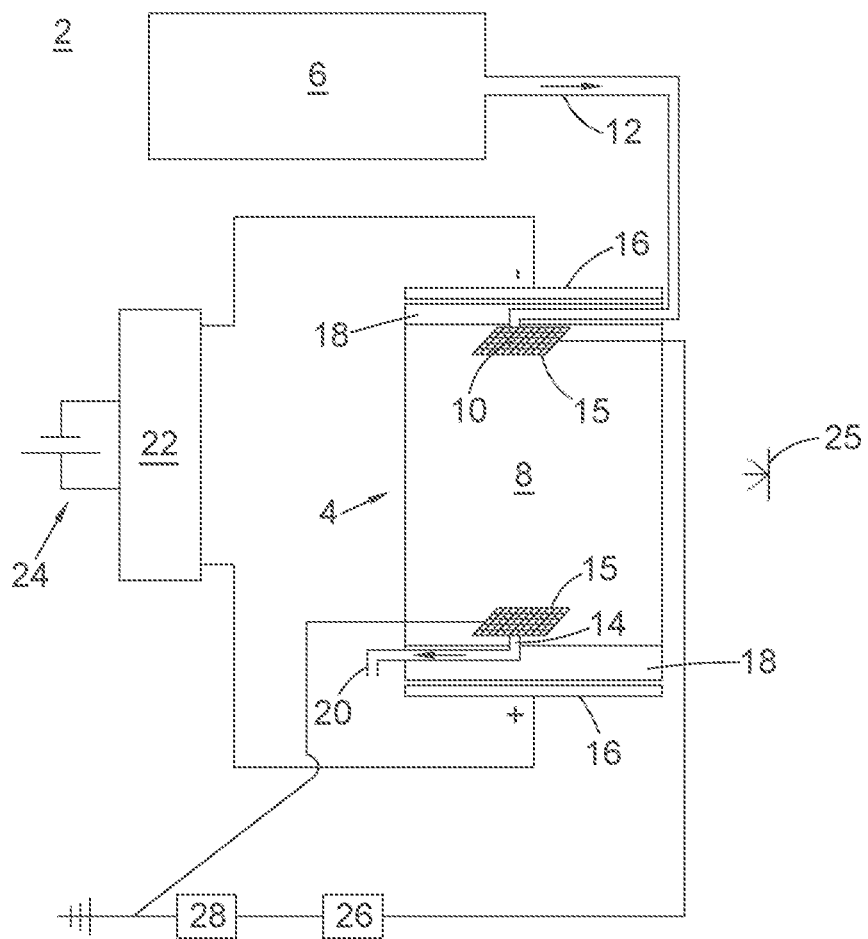
FIG. 1 illustrates an embodiment of an energy storage and conversion system using fluid flow.

With reference to FIG. 1, a system 2 for converting energy stored in a compressed fluid comprises an energy conversion device 4 connected to a reservoir 6 of compressed fluid, for example a compressed fluid container. The fluid is in some embodiments a gas, for example an inert gas such as Argon or Neon. A flow chamber 8 comprises a fluid inlet port 10 connected to the reservoir 6 by a conduit 12 at one end and a fluid exhaust port 14 at another, opposed end. Respective current collecting mesh electrodes 15 are provided at each end so that fluid flow from/through the inlet and exhaust ports 10, 14 flows through the mesh electrodes. In some embodiments, the ports extend through or are flush with their respective electrode 15. In some embodiments, other electrode geometries may be employed, for example a ring electrode around the respective port or disposed adjacent to it, a point electrode disposed adjacent its respective port, etc. The electrodes 15 may be configured the same or may each be different from the other with any combination of the disclosed or other geometries.

A pair of field generating electrodes 16 is spaced apart with the flow chamber 8 in between, with each electrode adjacent a respective one of the inlet and exhaust ports 10, 14. A dielectric material 18 is disposed between each field generating electrode 16 and an adjacent end of the flow chamber 8. In some embodiments, the dielectric material 18 is a solid, in other embodiments it is air or any other suitable dielectric. The field generating electrodes 16 are thus electrically isolated form the flow chamber 8. In some embodiments, the conduit 12 connects to the flow chamber 8 through the dielectric material 18 and/or an exhaust conduit 20 is connected to the exhaust port 14 through the dielectric material 18. The exhaust conduit 20 is in some embodiments connected fluidically to the surrounding atmosphere, directly or indirectly through an exhaust ion trap.

A high voltage, current limited supply 22 is connected to the field generating electrodes 16 to generate an electric field of sufficient strength inside the flow chamber 8 to separate charged species in the fluid. In some embodiments, the field is of sufficient strength to ionise the fluid. For example, the potential difference applied between the field generating electrodes by the supply may be such as to generate a field strength of 6000V/cm or larger to ionise Argon as the flowing fluid. A lower field strength is required for some fluids, such as Neon (600 V/cm) while a higher field strength would be required for other fluids, for example air (30 kV/cm). The supply 22 is fed from a source 24 of electrical energy, for example a dc source such as a battery, for example a 12V battery. In some embodiments, the supply 22 is configured to limit current so as to draw less than 2A from the battery (or other source of input current) in some embodiments. In some embodiments, the current in the circuit connected to the supply (output current) may also be limited, for example to less than 2A. In some embodiments, the output current was found to be limited by the breakdown current when the chamber 8 is filled with air and a spark occurs, which in some embodiments was found to be in a range around 50 too 100 mA. In some embodiments, the input voltage to the supply may vary, for example between 9 and 12V. In some embodiments, the supply 22 and source 24 are replaced with a high voltage capacitor that has previously been charged up by any suitable source.

A step-down converter 26 is connected to one, in some embodiments the lower potential one, in others the higher potential one (as illustrated), of the charge collecting electrodes 15 to step the potential difference between the electrodes 15 down to a required working voltage for a load 28 connected to the step down converter 26 in order to draw current from the step down converter 26 and hence the device 4. The load 28 is connected between the charge collecting electrode 15 in question and, in some embodiments, one side of the load and the corresponding current collecting electrode are connected to ground. In other embodiments the load 28 is connected between the charge collecting electrodes 15 in a floating arrangement. In some embodiments, the load 28 is connected between ground and one of the charge and the other one of the charge collecting electrodes is also connected to ground.

In some specific embodiments, the charge collecting electrodes 15 have an area of 1 $cm^2$ and are spaced 1.6 cm apart, with the field generating electrodes having an area of 5 $cm^2$ and spaced 7 cm apart. The flow chamber has a length of 7 cm and an internal volume of 34 $cm^3$, with the flow rate at 0.1 ml/minute ($1.7 \times 10^{-3}$ ml/s) by the flow resistance of conduits and ports 10, 12, 14, 20, and in particular by a relatively small flow cross-section/relatively high hydrodynamic resistance of the exhaust port 14, for a pressure in the reservoir of 10 bar.

Figure 2:
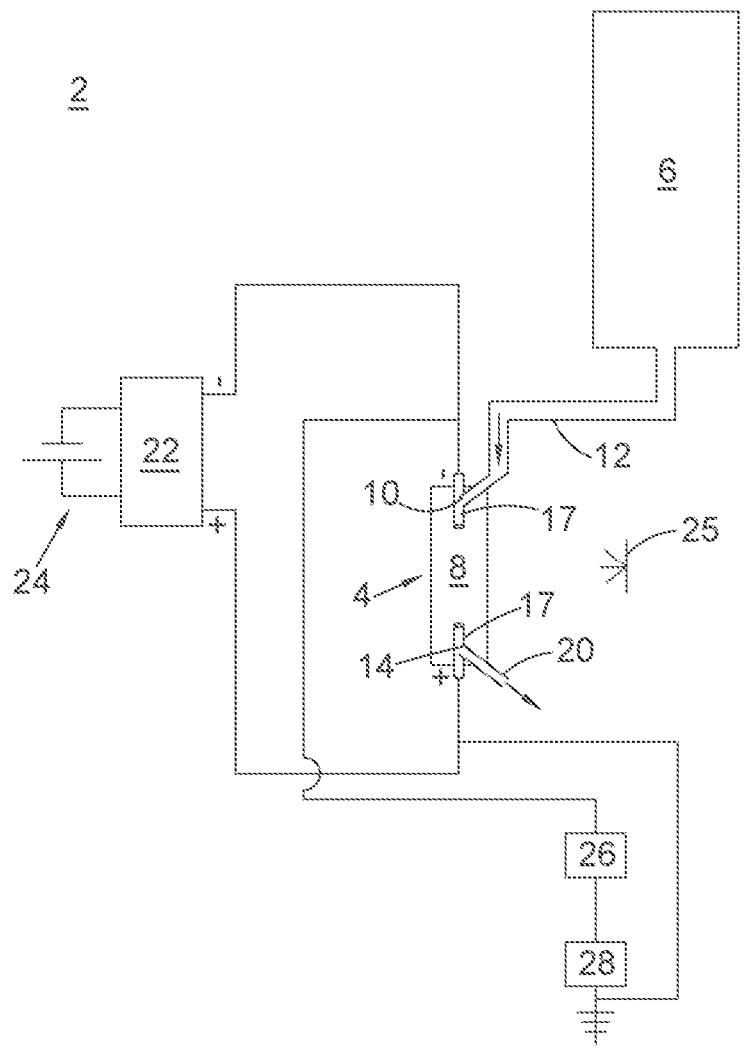
FIG. 2 illustrates an alternative embodiment of an energy storage and conversion system.

With reference to FIG. 2, in some embodiments, now described with reference to like reference numerals for like elements, the device 4 is arranged similarly to the device 4 described above with reference to FIG. 1 but with the field and collection electrodes 15, 16 replaced with combined field and collection electrodes 17 disposed within the flow chamber 8 at respective ends of the flow chamber 8 and connected to the supply 22. In some specific embodiments, the electrodes 17 are configured as a tubular electrode, with each electrode having its axis aligned along a common direction. In some embodiments, the inlet and exhaust ports 10, 14 are disposed in a side of a respective one of the electrodes 17. In some embodiments, the supply 22 is configured to prevent or strongly limit current corresponding to electrons flowing into a positive terminal of the supply 22, for example by means of a diode associated with the positive terminal of the supply 22.

The combined field and collection electrodes 17 are connected to respective terminals of the supply 22. The step down converter 26 is connected to one of the electrodes 17 in parallel with the supply 22 (which limits or blocks current flows from that electrode 17 back to the supply as described above) and the load 28 is connected to the step down converter 26. Specifically, the step down converter 26 and load 28 are connected between the electrodes 17. In some embodiments, one side of the load and one of the electrodes 17 are connected to ground. In some embodiments, the load is connected between one of the electrodes 17 (for example the lower potential one) and ground, with the other one of the electrodes 17 connected to ground to complete the circuit.

Figure 3:
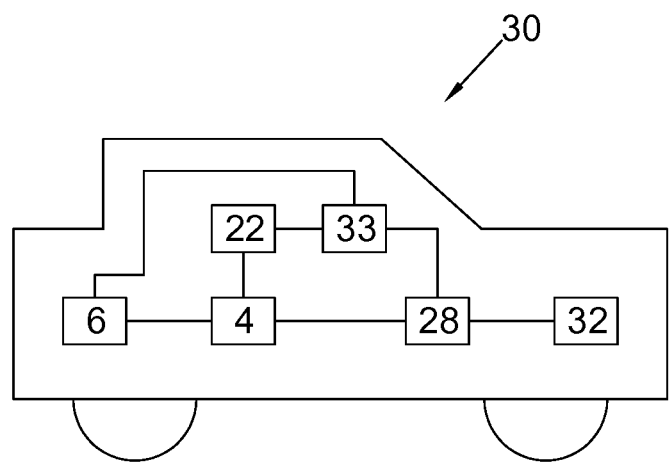
FIG. 3 illustrates an electric vehicle including the system of FIG. 1 or 2.

With reference to FIG. 3, an electric vehicle 30, for example an electric car, incorporates the reservoir 6 connected to an energy conversion device 4 as described above. The energy conversion device 4 is connected to the supply 22 and the load 28 as described above. The load 28 is an electric motor coupled to a drive train 32 of the vehicle for causing movement of the vehicle, for example driving wheels of the vehicle. In some embodiments, the energy stored in the pressurised fluid 6 in the reservoir is the sole source of energy to cause locomotion of the vehicle. The reservoir 6 is, in some embodiments, removably connected to the device 4 and can be exchanged against a full reservoir when empty. In other embodiments, the reservoir 6, whether removable/exchangeable or not, can be refilled with pressurised fluid through a refill port in the electric vehicle 30.

A controller 33 receives inputs from one or more of a vehicle driver interface (for example demand speed or torque), the load/motor 28 (for example current demand, actual current) and the reservoir 6 (for example pressure in the reservoir, as measured by pressure and/or flow sensors associated with the reservoir, for example) and controls the supply 22, specifically the voltage across electrodes 16 or 17, as the case may be, and a valve (not shown) regulating the flow of fluid from the reservoir 6 to the device 4. The controller 33, in accordance with specific embodiments controls the applied voltage and flow based on a suitable control law, for example using negative feedback to regulate current, flux, torque output or speed of the motor. For example, the field strength (i.e. voltage applied to electrodes 15/17) may be controlled based on power demand, with the field strength being increased with power demand. It will be appreciated that a suitable controller implementing a suitable control law is, in some embodiments, incorporated as described with reference to FIG. 3 in the embodiments of FIGS. 1 and 2, i.e. irrespective of the specific application. Of course, it will be appreciated that the specific control law implemented, and the sensed or received and controlled quantities will vary from one application to the next.

Figure 4:
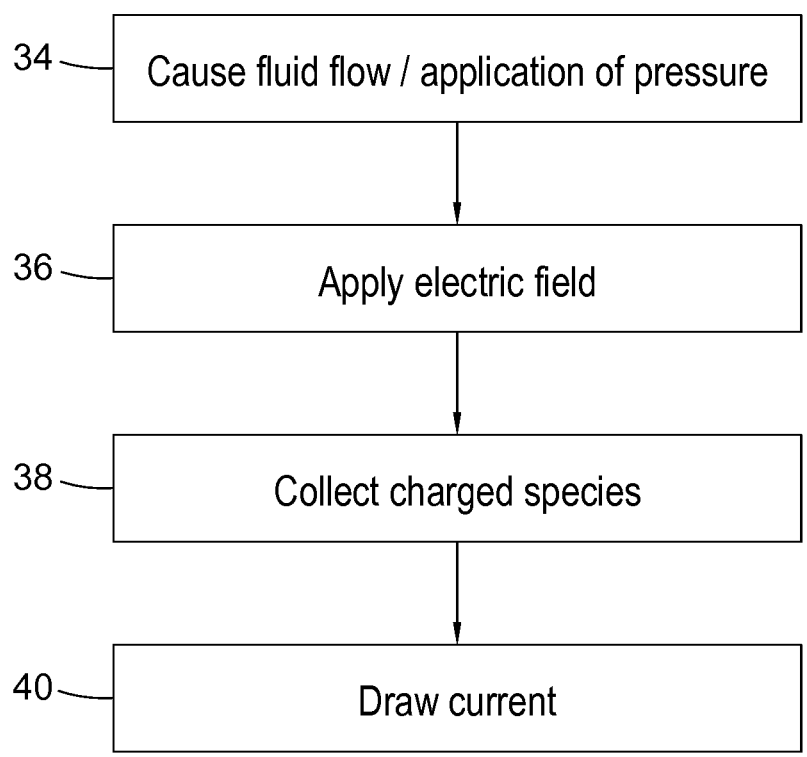
FIG. 4 illustrate a method of converting fluid energy to electrical energy.

With reference to FIG. 4, a method of operating the energy storage and conversion system is now described. Fluid flow from the reservoir 6 to the device 4 is caused at step 34 and at step 36 an electric field is applied to electrodes 16/17 to separate charged species in the fluid. In some embodiments, there is no or substantially no fluid flow and the kinetic energy is thought to be mainly provided by thermal motion due to pressure, and in such embodiments (described further below), pressure is applied to the chamber 8 by filling it with fluid under pressure with an exhaust closed or no exhaust present and keeping the chamber 8 connected to a source of pressurised fluid, for example the reservoir 6, or isolating the chamber from the reservoir. In embodiments in which the fluid is a gas, the gas is ionised by the electric field. For example, in some embodiments, the electric field cause a dark or a corona discharge in the gas. In some embodiments, the fluid is caused to flow along the direction of the electric field, depending on the geometry of the device 4. At step 38, the charged species (either inherent in the fluid or generated by ionisation, for example gas ions and electrons), are collected by the collection electrodes 16. The charged species may be affected differentially by the fluid flow due to, for example, the mobility of each species and/or the arrangements of electrodes relative to the flow. As a result, one of the charged species may preferentially leave the device 4 through the exhaust port 20 and the other one of the charged species may preferentially be collected by a corresponding electrode 15/17, as the case may be. As a result, due to the flow of fluid, the potential difference between electrodes 15/17 may be increased beyond that which it is would be otherwise and the corresponding excess charge can be drawn as current by the load 28 to do electrical work at step 40.

As described above, either or both of the fluid flow at step 34 (for example via a valve) or applied electric field at step 36 (for example via a voltage setting for the supply 22) may be controlled on the basis of one or more sensed or received parameters, in some embodiments. A sensed parameter may be indicative of energy dissipated by the load and a received parameter may be indicative of energy demand by the load. Control may further be based on sensed parameters like the pressure in the reservoir 6. Additionally, the voltage by the supply 22 is controlled, for example as described above based on power demand, to provide a field strength sufficient to ionise the fluid in the case of embodiments in which the fluid is a gas and for the device 4 to be able to supply the power demanded. The voltage may in some embodiments vary with time. For example, in some embodiments, a higher voltage is initially provided by the supply 22 until a discharge occurs in the gas and/or a plasma is generated and the voltage is then reduced to a lower level sufficient to maintain the discharge or plasma. Control of the field strength may be based on feedback, a time protocol or both to achieve efficient use of the fluid and meeting power demands.

The flow rate may be controlled to be substantially constant to the extent achievable, for example as the pressure inside the reservoir 6 varies and/or based demand or actual power dissipated in the load (or a related measure-see above). The controller may, in some embodiments, respond to power demand/power dissipated by increasing the flow rate and/or supply voltage. In addition or alternatively, in some embodiments the controller controls the pressure inside the flow chamber 8, for example in response to a signal from a pressure sensor inside the flow chamber 8. Flow rate and/or pressure may be controlled by controlling the flow resistance of the inlet conduit and port 12, 10 on the one hand and/or the flow resistance of the exhaust conduit and port 14, 20 on the other hand. For example, in some embodiments, a throttle valve may be provided in either or both of the conduits 12, 14 and/or the ports 10, 20 may have a variable aperture. In some embodiments, the throttle valve and/or variable aperture, as the case may be, are under the control of the controller, for example to control flow rate and/or pressure as described above.

It will be appreciated that the described control aspects are applicable to all embodiments described, including those described above with reference to FIG. 1, 2 or 3, as well as the further embodiments relating to flowing fluids below.

In some embodiments, the direction of flow and the field direction may point in generally opposite directions (i.e. have a negative scalar product). In these embodiments, the positive charged species is biased to move in different directions by the electric field and the flow. In the case of an ionised gas as working fluid, this means that the positive ions in the gas are in effect blown away from their corresponding capture electrode 16/17 by the flow and may thus be removed from the device 4 efficiently, while the higher mobility electrons are less affected by the fluid flow and in any case are biased towards their respective capture electrode 16/17 by the fluid flow. In some embodiments, however, the relative orientation of fluid flow and electric field may be reversed.

The performance of the specific embodiment described above with reference to FIG. 1 was characterised by way of illustration by varying the input voltage of the supply 22 between 9 and 12 Volt for a fixed flow rate of 0.1 ml/minute, a reservoir pressure of 10 bar and supply current of 2 A and two loads, which resulted in a varying power dissipated in the load above a threshold input voltage. The output voltage of the supply was pulsed with a maximum voltage amplitude of approximately 30 kV at the threshold input voltage and approximately 45 kV at the maximum supply input voltage of 12V. Some results are presented in the following table:

| Load (Ohm) | Threshold supply voltage (V) | Power dissipated at thresh. voltage (W) | Power dissipated at max voltage (W) |
|---|---|---|---|
| 10 | 9.6 | 6.4 | 40 |
| 4.7 | 9.7 | 13.6 | 340 |

Figure 5:
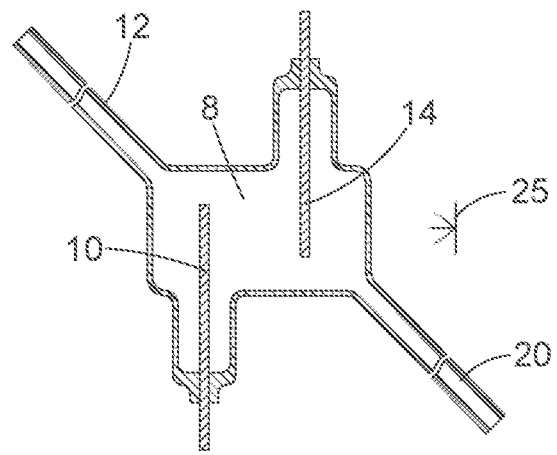
FIG. 5 illustrates a further embodiment of an energy storage and conversion system.
Figure 6:
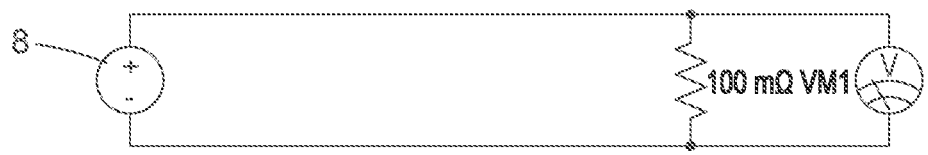
FIG. 6 illustrates a simplified circuit diagram of the further embodiment.

With reference to FIG. 5, in some embodiments of the system 2, the collection electrodes 10, 14 are tungsten, for example thoriated tungsten, rods disposed through wall of the flow chamber 8, for example a quartz chamber or a glass/silica chamber and the wall seals around the collection electrodes. It will be appreciated that any non-conducting material that can withstand the pressures and temperatures involved in each embodiment can be used and, similarly, any suitable electrode material can be used. The inlet 12 and outlet 20 are oriented relative to the chamber 8 to provide fluid flow substantially diagonally across the chamber 8. Only the chamber 8 and its components are illustrated in FIG. 5, the remaining components are omitted for clarity and are, in some embodiments, as described above with reference to FIG. 1. A simplified circuit diagram in which the device 4 is represented by a voltage source with positive and negative poles corresponding to the collection electrodes 10, 14, is illustrated in FIG. 6.

In some embodiments, for example any of the embodiments described above, the applied electric field is pulsed at step 36, that is the output voltage of the supply 22 is pulsed to produce a pulsed waveform of electric field strength/potential difference between electrodes 16 that comprises a sequence of pulsed. For example, the pulses may have a complex shape, such as a large pulse with smaller pulses each side, with a pulse width of 1 ms and a cycle time of 4 ms. It will be appreciated that other pulse-shapes, such as a substantially top-hat shape, a sinc shape, a bell shape or any other suitable shape may be employed. In some embodiments, additionally or alternatively, the chamber 8, for example in particular the collector electrodes, may be irradiated with electromagnetic radiation in the wavelength range of 120 NM to 820 NM, for example UV light to facilitate ionisation in the chamber 8. In such embodiments, a corresponding radiation/light source 25 is disposed in relation to the chamber 8 to irradiate the chamber accordingly.

Using the embodiment described with reference to FIG. 5, a one-minute experimental run of gas flow (neon gas) through the chamber 8 with a pulsed applied electric field were run with the following experimental parameters and result:

| Pulsed applied electric field | | | | | | | |
|---|---|---|---|---|---|---|---|
| Potential diff. (kV) | Resistor Value (ohms) | Flow rate (L/m) | Gas Pressure (Bar) | Measured Voltage Vrms (V) | Calculated Current rms (A) | Calculated Power rms (W) | Input Power (W) |
| 50.0 | 0.10 | 0.2 | 10 | 6.4 | 64 | 410 | 6.0 |

The potential difference corresponds to the pulsed potential difference across the electrodes 16 and hence the pulsed output of the source 22 (with a wave form as described in the specific example above and a maximum amplitude of 50 kv, rms 4 kv), the resistor value is the value of the load/measurement resistor illustrated in FIG. 6, where a Root Mean Square Voltage over the run is measured using an oscilloscope, with RMS current and power values calculated based on the value of the load resistor. The input power is the power fed to the supply 22 to generate the potential difference. The flow rate (litres per minute) and gas pressure refer to the flow rate and pressure of the gas in inside the chamber 8. It can be seen that the calculated RMS power dissipated in the load exceeds the input power, with the difference in power believed to be provided by the kinetic energy of the flow of pressurised ionised gas.

Corresponding data for a constant applied electric field, with otherwise unchanged experimental parameters, is presented in the following table:

| Constant applied electric field | | | | | | | |
|---|---|---|---|---|---|---|---|
| Potential diff. (kV) | Resistor Value (ohms) | Flow rate (L/m) | Gas Pressure (Bar) | Measured Voltage Vrms (V) | Calculated Current rms (A) | Calculated Power rms (W) | Input Power (W) |
| 50.0 | 0.10 | 0.2 | 10 | 2.4 | 24 | 58 | 1.5 |

It can be seen that a pulsed application of the electric field may facilitate better extraction of energy from the pressurised gas flow with a ratio of calculated power dissipated across the load to electric input power of 68 for a pulsed applied field and 39 for the constant applied field.

Figure 7:
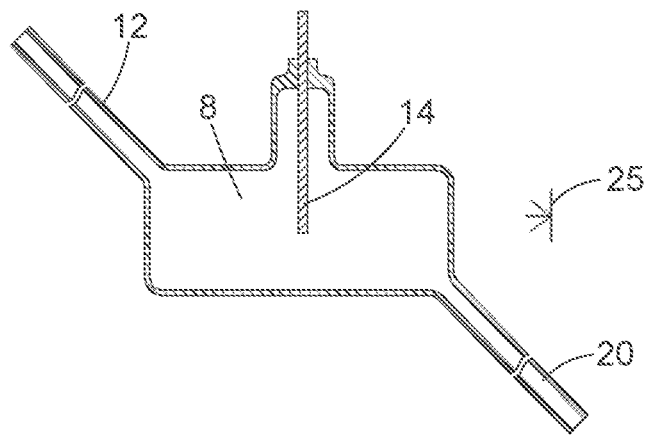
FIGS. 7 to 10 illustrate yet further embodiments of an energy storage and conversion system.

With reference to FIG. 7, in one variant of the above embodiments, only a single collection electrode 14 is disposed within the chamber 8 and may be connected to a load in a floating or earth-connected manner.

Figure 8:
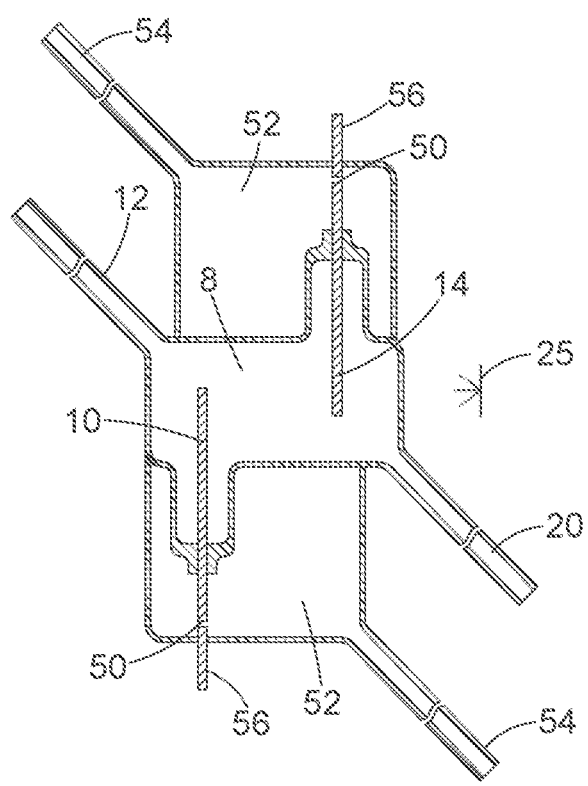

With reference to FIG. 8, in some variants applicable to all embodiments described above and below, a means for delaying onset of current flow to enable more charge build-up on the collection electrodes 10, 14 is provided. Specifically, in some embodiments, the free ends 50 of the collection electrodes 10, 14 are enclosed in a respective further chamber 52 sealed to the chamber 8 and filled with an inert gas with low breakdown voltage, for example Neon, through a further respective inlet 54. A further respective electrode 56, for example a tungsten electrode, is disposed sealingly through the wall of the chamber 52 in juxtaposition with the free ends 50 to define a spark gap between each free end 50 and the corresponding further electrode 56. The further electrodes 56 are connected to the remaining system 2 (not shown) en lieu of the collection electrodes 10, 14.

As fluid flows through the chamber 8 while being ionised by the applied electric field, charge accumulates on the collection electrodes 10, 14 until a potential difference between the collection electrodes 10,14 exceeds the breakdown voltage of the inert gas in the further chambers 52 across the spark gap, at which point a discharge occurs and current flows through the further electrodes 56 as long as the spark is maintained. In this way, it will be seen that current flow is delayed until sufficient charge has built up on the electrodes 10,14 to cause a spark. Of course, it will be understood that any other way of delaying the onset of current flow can also be employed in related embodiments, for example using a voltage triggered relay or switch, a diode or timed switch in place of the spark gap.

Figure 9:
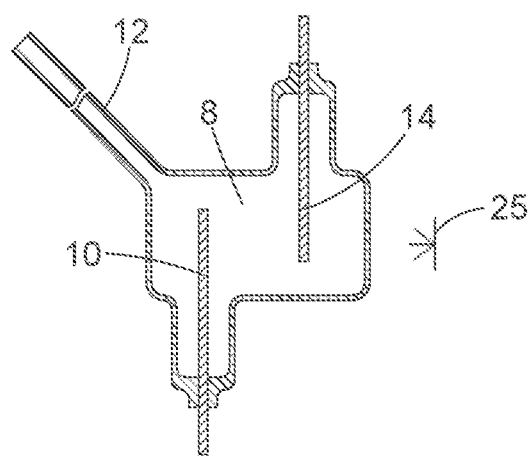

As briefly mentioned above, energy stored in a pressurised fluid may be converted to electrical energy also by mainly or exclusive application of pressure to a fluid, as such. Flow-based embodiments described above can be converted to pressure-based embodiments by blocking the exhaust 20, either permanently or removably, for example using a stop-cock. In some embodiments, illustrated in FIG. 9, the chamber 8 is modified by removing the exhaust 20 entirely, so that the chamber 8 is in fluidic communication only through the inlet 12.

An experimental one-minute run of pressure-based energy conversion was carried out using the embodiment of FIGS. 5 and 6 with the exhaust 20 blocked off and experimental parameters and results are presented in the following table for a pulsed electric field (with the same parameters described above for the flow-based experiment). At the beginning of the run the chamber was filled with Neon gas at a pressure of 10 bar and the chamber was then sealed from the gas supply. Over the run a decline in pressure was observed, believed to be due to energy conversion, since the pressure was substantially constant over a similar time-period without drawing current from the collector.

| Pulsed applied electric field | | | | | | | |
|---|---|---|---|---|---|---|---|
| Potential diff. (kV) | Resistor Value (ohms) | Initial Gas Pressure (Bar) | Final Gas Pressure (Bar) | Measured Voltage Vrms (V) | Calculated Current rms (A) | Calculated Power rms (W) | Input Power (W) |
| 50.0 | 0.10 | 10 | <0.1 | 6.4 | 64 | 360 | 6.0 |

The calculated rms power is calculated over the whole one minute run and therefore averages over the change in pressure during the run.

As for the flow embodiments described above, the pressure embodiments can equally be operated with a pulsed or constant applied field, with otherwise unchanged experimental parameters. Experimental parameters and results are presented in the following table.

| Constant applied electric field | | | | | | | |
|---|---|---|---|---|---|---|---|
| Potential diff. (kV) | Resistor Value (ohms) | Initial Gas Pressure (Bar) | Final Gas Pressure (Bar) | Measured Voltage Vrms (V) | Calculated Current rms (A) | Calculated Power rms (W) | Input Power (W) |
| 50.0 | 0.10 | 10 | <0.1 | 6.4 | 64 | 40 | 1.5 |

As can be seen, a similar trend as for the flow-based experiments discussed above can be observed. For completeness it can be noted that the lower input power is due to a different power source being used and lower current drawn by the supply to maintain the constant field as opposed to continually charging and discharging the field electrodes.

Figure 10:
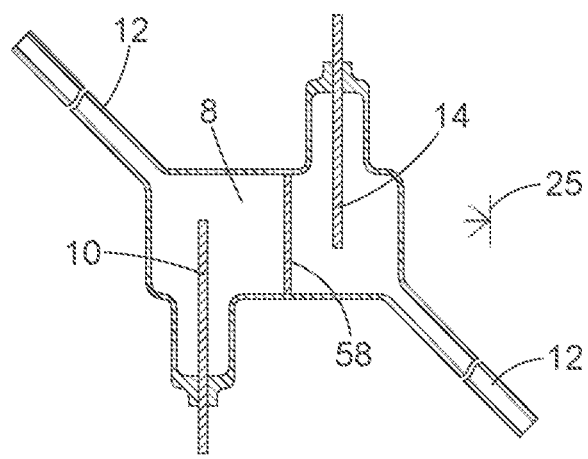

As described above, any flow-based embodiment can be converted into a pressure-based embodiment by stopping the exhaust 20. In some embodiments, illustrated in FIG. 9, the chamber 8 is modified by removing the exhaust 20 entirely, so that the chamber 8 is in fluidic communication only through the inlet 12, with other components of the device 4 remaining unchanged in some embodiments. In some other embodiments, illustrated in FIG. 10, a partition 58, for example a quartz window, sealingly partitions the chamber 8 into two portions, each one comprising one of the collections electrodes 10, 14 and the exhaust 20 is connected as a further inlet 12 so that each portion of the chamber 8 has a respective inlet 12 connected to a source of pressurised fluid and pressure is maintained independently in each portion of the chamber 8, with other components of the device 4 remaining unchanged in some embodiments. In some embodiments the chamber is made as a unitary workpiece comprising the chamber wall and partition 58.

Specific embodiments have been described above by way of example to illustrate aspects of the disclosure. It will be understood that the scope of the invention is set out in the appended claims. Many modifications and different combinations of features will be apparent to a person having ordinary skill in the art, for example as set out above, which are within the scope of the claims. Further, it will be appreciated that the order of steps of the method embodiments can be changed as suitable and that some or all of the steps may indeed be carried out in fully or partially overlapping relationship in time. Equally, features of the various embodiments described above may be combined as appropriate. Some of the embodiments are based on fluid flow, while others are based on an applied pressure, with no or minimal flow. It will be understood that, as applicable, any feature described with respect to a flow based embodiment is also applicable to any pressure based embodiments and vice versa. Where the present invention makes reference to charged, positive and negative respectively, species, each species may correspond to a single type of entity (e.g. singly charged positive gas ions and electrons, respectively) or each may comprise sub-species, for example positively charged gas ions with different respective charges. Similar considerations apply to embodiments in which the liquid is a solution with respective ions in solution.

In any of these items, the applied electric field may be a pulsed electric field, and/or the flow chamber may be irradiated with electromagnetic radiation, for example UV light or electromagnetic radiation within one or more wavelength in a range of 120 NM to 820 NM. Additionally, or alternatively, the current flow may be delayed in any of the items, to enable an amount of charge to build up on the electrode(s) before current flows. In addition, or in alternative, to all, some or any of these variations, the pair of charge collecting electrodes may be replaced with a single charge collecting electrode in all items.

In any of the items above, the device or system may be configured to limit flow rates in and/or out of the flow chamber or pressure vessel to less than 0.1 ml/minute, for example less than $9\times10^{-2}$ ml/minute, less than $8\times10^{-2}$ ml/minute or less than $7\times10^{-2}$ ml/minute, or may, more generally be configured to cause fluid to flow through the pressure vessel or flow chamber at a flow rate different from 0.1 ml/minute, for example $9\times10^{-2}$ ml/minute, $8\times10^{-2}$ ml/minute or $7\times10^{-2}$ ml/minute, as well as a flow rate higher than 0.1 ml/minute, for example 0.5 ml/minute or higher, 1 ml/minute or higher, 0.05 l/minute or higher, 0.1 ml/minute or higher or 0.2 ml/minute or higher. Equally, the device and/or system may be configured to operate at specific pressure, for example a pressure different from 10 bar, such as more than 10 bar, for example 11 bar or more or 12 bar. The pressure may be less than 10 bar, for example 9 bar or less, 8 bar or less, 7, 6 or 5 bar or less and in any of these cases, the pressure may be more than 1 bar, more than 2 bar, more than 3 bar or more than 4 bar. In some embodiments, the flow rate is substantially zero. For example, in some embodiments, the inlet port is the only fluidic communication path to and from the pressure vessel. It will be appreciated that the corresponding method items may operate accordingly.

The invention claimed is:

1. A device for converting energy of a fluid to electrical energy, the device comprising:
   a pressure vessel having an inlet port for a fluid and configured to retain pressurised fluid from the inlet port in the pressure vessel, wherein the pressure vessel is otherwise sealed and wherein the pressurised fluid is retained at more than 1 bar;
   a pair of charge collecting electrodes spaced apart from each other along a collection direction and disposed within the pressure vessel; and
   an electric field generator configured to generate an electric field in the pressure vessel along a field direction throughout a time period, wherein generating the electric field throughout the time period causes separation of positive and negative charged species in the pressurised fluid throughout the time period, and wherein separating the positive and negative charged species in the pressurised fluid causes conversion of the energy of the pressurised fluid to the electrical energy throughout the time period.

2. A device according to claim 1, wherein the electric field is an ionising electric field to ionise the fluid.

3. A device according to claim 1, wherein the electric field generator comprises a pair of field generating electrodes spaced apart along the field direction and disposed on either side of the pressure vessel.

4. A device according to claim 3, wherein the field generating electrodes are electrically isolated from the pressure vessel.

5. A device according to claim 1, wherein the field direction and the collection direction are substantially parallel.

6. A device according to claim 1, wherein the pressure vessel comprises a partition between the charge collecting electrodes sealing the pressure vessel into a first portion connected to the inlet port and comprising one of the charge collecting electrodes and a second portion connected to a further inlet port and comprising another one of the charge collecting electrodes.

7. A device according to claim 1 comprising a current delay arrangement for delaying current flow from the charge collection electrode or charge collecting electrodes until an amount of charge has built up on the charge collecting electrode.

8. A device according to claim 7, wherein the current delay arrangement comprises a further pressure vessel sealed around a portion of the charge collecting electrode protruding out of the pressure vessel and a further electrode disposed in the further pressure vessel wherein respective free ends of the charge collecting electrode and further electrode define a spark gap therebetween.

9. A device according to claim 1, wherein the device comprises a single charge collecting electrode instead of a pair of charge collecting electrodes.

10. A device according to claim 1 comprising a source of electromagnetic radiation for irradiating a pressurised fluid inside the pressure vessel.

11. A device as claimed in claim 10, wherein the source of electromagnetic radiation is configured to generate electromagnetic radiation in a wavelength range of 120 NM to 820 NM.

12. A device according to claim 1, wherein the fluid is a gas, for example air, Argon or Neon.

13. A method of converting energy of a pressurised fluid to electric energy, the method comprising:
- causing the pressurised fluid to maintain a pressure of more than 1 bar inside a pressure vessel;
- applying an electric field to the pressurised fluid in the pressure vessel throughout a time period, wherein applying the electric field throughout the time period causes separation of positive and negative charged species of the pressurised fluid throughout the time period along a field direction of the electric field;
- collecting at least a fraction of one or each of the positive and negative charged species at a respective current collector throughout the time period; and
- drawing a current from one of the current collectors to provide electrical energy to a load.

14. A method according to claim 13 comprising ionising the fluid by applying the electric field to the flowing fluid to produce an ionised fluid comprising the negative and positive charged species.

15. A method according to claim 14, wherein ionising the fluid comprises generating a plasma.

16. A method according to claim 14, wherein ionising the fluid comprises causing a discharge, for example a dark or corona discharge.

17. A method according to claim 13, the method comprising delaying current flow from the current collector or current collectors until an amount of charge has built up on the current collectors.

18. A method according to claim 17, wherein delaying current flow comprises delaying current flow until a spark occurs in a spark gap between a free end of the current collector or collectors protruding outside the pressure vessel and a respective current receiving electrode.

19. A method according to claim 13, the method comprising irradiating the pressurised fluid with electromagnetic radiation while causing the pressurised fluid to maintain a pressure in the pressure vessel.

20. A method of converting energy of a pressurised fluid to electric energy, the method comprising:
- causing the pressurised fluid to flow through a flow chamber along a flow direction between an inlet port and an exhaust portion of the flow chamber, thereby converting the potential energy to kinetic energy of the flowing fluid;
- applying a pulsed electric field to the fluid flowing in the flow chamber throughout a time period with an electric field generator; wherein applying the pulsed electric field causes separation of one or each of a positive and negative charged species in the pressurised fluid throughout the time period, and wherein separating the charged species in the pressurised fluid causes conversion of the energy of the pressurised fluid to the electrical energy throughout the time period;
- collecting at least a fraction of one or each of a positive and negative charged species at a respective current collector throughout the time period; and
- drawing a current from a current collector to provide electrical energy to a load.

* * * * *